(12) United States Patent
Byk et al.

(10) Patent No.: US 11,690,023 B2
(45) Date of Patent: Jun. 27, 2023

(54) INTERFERENCE MITIGATION FOR PORTABLE COMMUNICATION DEVICE

(71) Applicant: MOTOROLA SOLUTIONS, INC., Chicago, IL (US)

(72) Inventors: Dennis A. Byk, Ft. Lauderdale, FL (US); Javier Alfaro, Miami, FL (US); Giorgi Bit-Babik, Plantation, FL (US); Stephen B. Einbinder, Sunrise, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/461,560

(22) Filed: Aug. 30, 2021

(65) Prior Publication Data

US 2023/0060811 A1     Mar. 2, 2023

(51) Int. Cl.
*H04W 52/24* (2009.01)

(52) U.S. Cl.
CPC ....... *H04W 52/243* (2013.01); *H04W 52/246* (2013.01)

(58) Field of Classification Search
CPC .......................... H04W 52/243; H04W 52/246
See application file for complete search history.

(56) References Cited

U.S. PATENT DOCUMENTS

| | | | |
|---|---|---|---|
| 8,625,566 B1 | 1/2014 | Husted et al. | |
| 9,161,386 B1 * | 10/2015 | Beghini | H04W 88/06 |
| 9,379,828 B2 | 6/2016 | Banasky, Jr. | |
| 9,614,741 B2 | 4/2017 | Petrucci et al. | |
| 9,838,976 B1 * | 12/2017 | Jorgovanovic | H04W 52/42 |
| 10,581,155 B1 | 3/2020 | Gradinaru et al. | |
| 10,819,457 B1 | 10/2020 | Alaburda et al. | |
| 10,873,348 B2 | 12/2020 | Faraone et al. | |
| 2010/0029204 A1 * | 2/2010 | Gao | H04W 52/245 455/41.2 |
| 2010/0197235 A1 | 8/2010 | Wilhelmsson | |

(Continued)

FOREIGN PATENT DOCUMENTS

| | | | |
|---|---|---|---|
| CN | 108183725 A | 6/2018 | |
| EP | 1838040 A2 * | 9/2007 | H04W 52/242 |

(Continued)

OTHER PUBLICATIONS

International Search Report and Written Opinion for Related Application No. PCT/US2022/075217 dated Dec. 9, 2022 (15 pages).

*Primary Examiner* — Keith Ferguson
(74) *Attorney, Agent, or Firm* — Michael Best & Friedrich LLP (57) ABSTRACT

Methods and systems for mitigating interference between different transceivers in a portable communication device. An electronic control circuit is configured to quantify an electromagnetic isolation between a first transceiver of a portable communication and a second transceiver of the portable communication device based on a detected radio frequency power coupled to the first transceiver from radio frequency signals transmitted by the second transceiver. A mitigation action is selected from a plurality of mitigation actions based on a magnitude of the quantified electromagnetic isolation. The selected mitigation action is then applied to the second transceiver to adjust at least one radio frequency characteristic of the second transceiver.

20 Claims, 6 Drawing Sheets

(56) References Cited

U.S. PATENT DOCUMENTS

2013/0171955 A1    7/2013   Makhlouf et al.
2017/0064773 A1    3/2017   Anderson et al.
2020/0389902 A1   12/2020   Hiben et al.
2021/0051607 A1    2/2021   Klomsdorf et al.

FOREIGN PATENT DOCUMENTS

JP         4414957 B2    2/2010
KR    20170069527 A    6/2017
WO     2021021450 A1    2/2021

* cited by examiner

INTERFERENCE MITIGATION FOR PORTABLE COMMUNICATION DEVICE

BACKGROUND OF THE INVENTION

Some communication devices may include multiple transceivers. In some communication devices, transceivers operating at nearby or overlapping frequencies can result in the transceivers causing interference with one another when operating simultaneously in the same communication device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Methods and systems are provided in this disclosure for mitigating interference between different transceivers in a portable communication device. An electronic control circuit is configured to quantify an electromagnetic isolation between a first transceiver of a portable communication and a second transceiver of the portable communication device based on a detected radio frequency power coupled to the first transceiver from radio frequency signals transmitted by the second transceiver. A mitigation action is selected from a plurality of mitigation actions based on a magnitude of the quantified electromagnetic isolation. The selected mitigation action is then applied to the second transceiver to adjust at least one radio frequency characteristic of the second transceiver.

In some implementations, applying the selected mitigation action includes adjusting a maximum transmit power setting of the second transceiver. In some implementations, applying the selected mitigation action includes at least one selected from a group consisting of adjusting the maximum transmit power setting of the second transceiver, tuning an impedance of the second transceiver, and engaging a shunt radio frequency switch at an antenna of the second transceiver to introduce significant radio frequency power attenuation.

In some implementations, the electromagnetic isolation is quantified as a difference between a measured radio frequency transmit power of the second transceiver and a measured radio frequency power received by the first transceiver from the second transceiver. In some implementations, the electromagnetic isolation is quantified as a ratio of the measured radio frequency transmit power of the second transceiver relative to the measured radio frequency power received by the first transceiver from the second transceiver.

Some communication devices, such as, for example, portable communication devices, may include multiple transceivers within a single communication device. In some implementations, different transceivers within the same communication device may be configured to operate on different communication protocols including, for example, "long-term evolution" (LTE) transceivers, "wireless local area network" (WLAN) transceivers, "global positioning system" (GPS) transceivers, and "land mobile radio" (LMR) transceivers.

In some implementations, different transceivers in the same device operating simultaneously in nearby or overlapping frequencies can result in transceivers causing interference with one another. The extent of interference is a function of, among other things, the radiated coupling between antennas. The amount of coupling between the antennas can be impacted by environmental conditions. For example, the resulting coupling between antennas in a device can vary by several dB depending on whether the communication device is held in a user's hand, held against the user's head, held in a holster at the user's hip, placed in a charger, or sitting on the hood or trunk of a vehicle. Less coupling results in less interference and, conversely, more coupling results in more interference.

In some implementations, interference between transceivers in the same communication device is mitigated by identifying one transceiver as a higher priority transceiver relative to the other transceiver(s) and effectively disabling (i.e. attenuating) the transceiver of lower priority so that the higher priority transceiver can operate free of interference. In some implementations, communication systems configured to apply this mitigation technique assume a worst case (i.e., maximum) coupling conditions to ensure that the higher priority transceiver never experiences interference from the secondary transceiver. However, depending on the operating conditions of the communication device and/or the current environmental conditions, the coupling between the transceivers may not be the worst case (i.e., maximum) coupling and disabling/attenuating the secondary transceiver may result in reducing the performance of the secondary transceiver by a greater degree than necessary to achieve reliable performance of the primary transceiver. Additionally, if the antenna corresponding to the primary transceiver becomes damaged and the control system of the communication device is unaware of the fault condition, then the interference mitigation mechanism may degrade the performance of the secondary transceiver when the secondary transceiver is needed as a backup communication solution.

In some implementations, the systems and methods described in the examples herein provide dynamic power-level control based on changing real-world transceiver coupling conditions. Power-level control can be achieved by applying different mitigation techniques including, for example, power tuning, antenna tuning/mismatch, and attenuation. Some mitigations applied to the secondary transceiver by these systems to reduce the effect of coupling on the primary transceiver may still cause a degradation of performance on the secondary transceiver. However, in some implementations, the systems are configured to apply a mitigation (or increase the applied mitigation) when the detected coupling is high and to apply a reduced mitigation (or eliminate the applied mitigation) in low-coupling scenarios. As a result, the systems allow the primary transceiver and the secondary transceiver to both operate simultaneously even while mitigating interference from the secondary transceiver on the primary transceiver.

Figure 1:
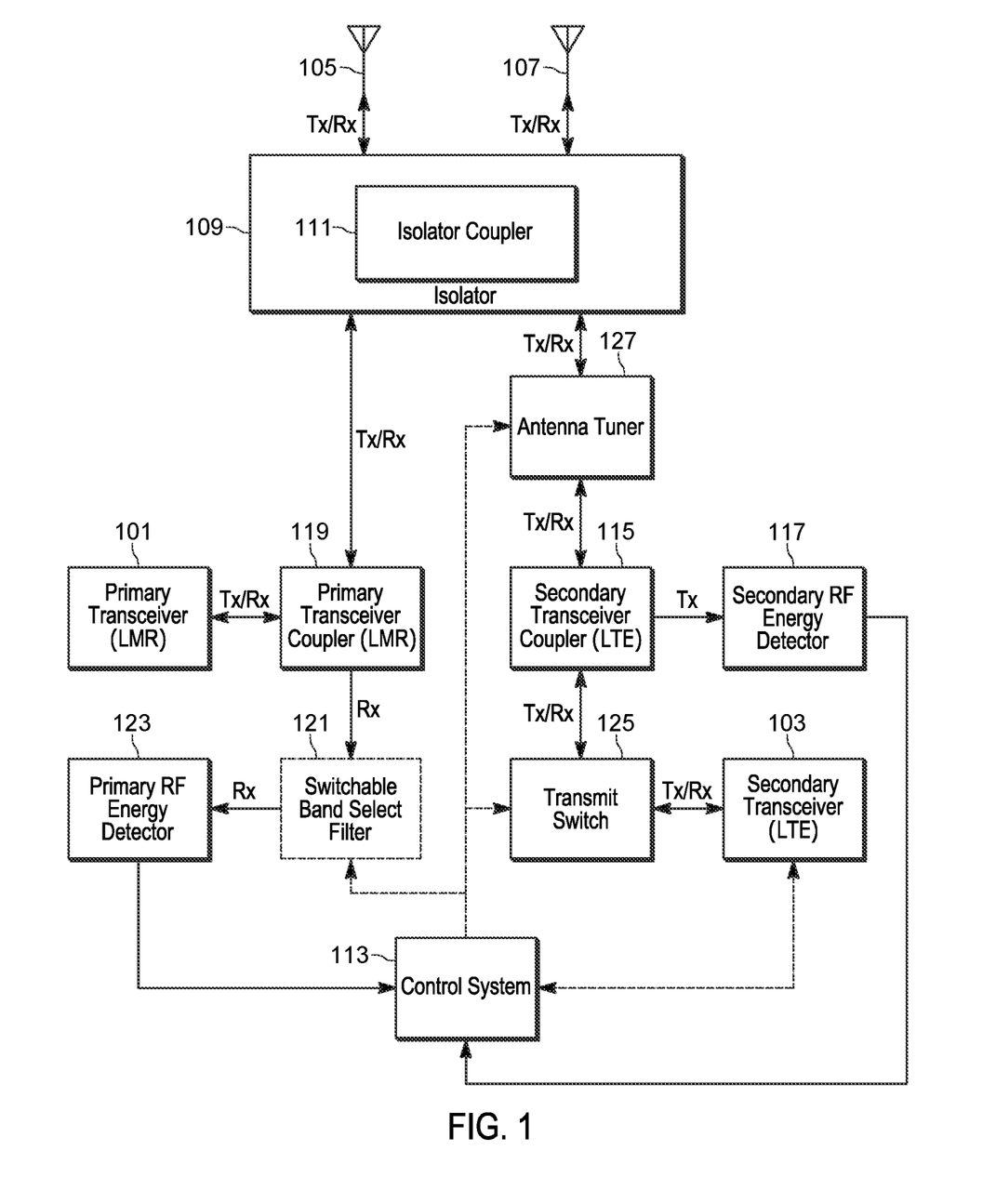
FIG. 1 is a block diagram of a communication device including multiple transceivers and an interference mitigation system in accordance with some embodiments.

FIG. 1 illustrates an example of a system configured to detect & quantify at least one characteristic of coupling between transceiver antennas in real-time (or near real-time) and to determine & apply an appropriate mitigation depending on a magnitude of the quantified characteristic of coupling. The system of FIG. 1 includes a primary transceiver 101 and a secondary transceiver 103. In this example, the primary transceiver 101 is an LMR transceiver and the secondary transceiver 103 is an LTE transceiver. The primary transceiver 101 is configured to transmit and receive radio-frequency signals through a primary antenna 105 and the secondary transceiver 103 is configured to transmit and receive radio-frequency signals through a secondary antenna 107. The system of FIG. 1 also includes an isolator 109, which includes an isolator coupler 111, configured to reduce electromagnetic coupling between the primary antenna 105 and the secondary antenna 107. In the example of FIG. 1, the signals from both the primary transceiver 101 and the secondary transceiver 103 flow in and out of the isolator 109.

The system of FIG. 1 also includes a control system 113 including one or more electronic controllers and/or electronic circuits configured to monitor and control the operation of the system of FIG. 1 including, for example, the interference mitigation mechanisms described herein. The secondary transceiver 103 is communicatively coupled to the control system 113 and, in some implementations, is configured to transmit a control signal to the control system 113 indicating whether the secondary transceiver 103 is transmitting radio-frequency signals. In some implementations, the secondary transceiver 103 is also configured to transmit to the control system 113 an indication of the frequency of the radio-frequency signals being transmitted by the secondary transceiver 103.

A secondary transceiver coupler 115 is coupled between the secondary transceiver 103 and the secondary antenna 107 and is configured to sample the radio-frequency energy of the radio-frequency signals being transmitted by the secondary transceiver 103. The sampled radio-frequency energy is then provided from the secondary transceiver coupler 115 to a secondary radio-frequency energy detector 117, which, in turn, transmits a signal indicative of a detected RF transmit energy of the secondary transceiver 103 to the control system 113.

Similarly, a primary transceiver coupler 119 is coupled between the primary antenna 105 and the primary transceiver 101 and is configured to sample the radio-frequency energy of radio-frequency signals received by the primary antenna 105. The sampled radio-frequency energy is then provided to a primary radio-frequency energy detector 123, which, in turn, transmits to the control system 113 a signal indicative of a detected RF energy received by the primary antenna 105. In some implementations, a switchable band select filter 121 is coupled between the primary transceiver coupler 119 and the primary radio-frequency energy detector 123 As discussed in further detail below, the switchable band select filter is configured to filter received RF signals that do not correspond to the radio-frequency signals currently being transmitted by the secondary transceiver 103 and, in this way, the primary radio-frequency energy detector 123 is able to more specifically measure RF energy received by the primary antenna 105 due to coupling between the primary antenna 105 and the secondary antenna 107. In some implementations, the switchable band select filter 121 is configured to receive a control signal from the control system 113 and to adjust the band of frequencies isolated from the radio-frequency signals received by the primary antenna 105 based on the control signal from the control system 113.

By receiving the signal from the secondary radio-frequency energy detector 117 indicative of the detected RF transmit energy of the secondary receiver and the signal from the primary radio-frequency energy detector 123 indicative of the detected RF energy received by the primary antenna 105, the control system 113 is able to quantify the electromagnetic isolation/coupling between the primary transceiver 101 and the secondary transceiver 103 based, for example, on the amount of RF energy transmitted by the secondary transceiver 103 that is detected as RF energy received by the primary antenna 105. For example, in some implementations, the control system 113 includes circuitry and/or software-enable functionality configured to determine a difference and/or a ratio between the output from the primary radio-frequency energy detector 123 and the output from the secondary radio-frequency energy detector 117.

Based on the quantified isolation/coupling between the primary transceiver 101 and the secondary transceiver 103, the control system 113 determines an appropriate mitigation technique for reducing the detrimental effects of interference from the secondary transceiver 103 on the primary transceiver 101. For example, the control system 113 may be configured to select a mitigation technique for a plurality of different available mitigation techniques based on the quantified isolation/coupling. In some implementations, the control system 113 is configured to use a combination of hardware and software mitigation techniques where hardware mitigation is applied more rapidly (e.g., instantaneously) until the software mitigation can be properly engaged. As illustrated in the example of FIG. 1, the control system 113 may be configured to apply various different mitigation techniques, for example, by transmit control signals to one or more of the secondary transceiver 103 itself, a transmit switch 125, and an antenna tuner 127.

In the example of FIG. 1, the transmit switch 125 is coupled between the secondary transceiver 103 and the secondary antenna 107 and, in some implementations, may be configured to apply a defined amount of attenuation to the RF transmit signal in response to a control signal received from the control system 113. In other implementations, the transmit switch 125 may be a variable attenuation switch configured to apply various different levels of attenuation to the RF transmit signal of the secondary transceiver 103 depending on the control signal received from the control system 113.

Additionally, in the example of FIG. 1, the antenna tuner 127 is coupled between the secondary transceiver 103 and the secondary antenna 107 (or, more specifically, between the secondary transceiver coupler 115 and the secondary antenna 107) and is configured to adjust the tuning frequency of the RF transmit signal output by the secondary antenna 107 and/or the antenna/transceiver impedance in response to a control signal received from the control system 113.

Figure 2:
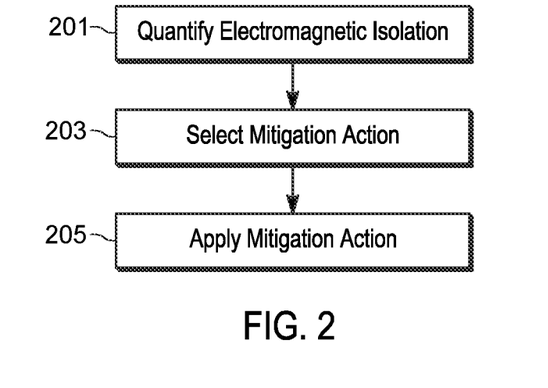
FIG. 2 is a flowchart of a method for identifying and applying an appropriate mitigation based on a detected interference using the system of FIG. 1.

As illustrated in the example of FIG. 2 and as described above in reference to FIG. 1, the system in the example of FIG. 1 is configured to quantify the electromagnetic isolation between the primary transceiver 101 and the secondary transceiver 103 (step 201), select an appropriate mitigation action from a plurality of available mitigation actions based on the quantified isolation (step 203), and then apply the selected mitigation action to the communication device (step 205). In some implementations, the plurality of available mitigation actions may include various different types of mitigation including, for example, power tuning, antenna tuning/mismatch, signal attenuation, and/or other mitigation techniques. However, in other implementations, the plurality of available mitigation actions may include various different levels/magnitudes of the same type of mitigation action.

Figure 3:
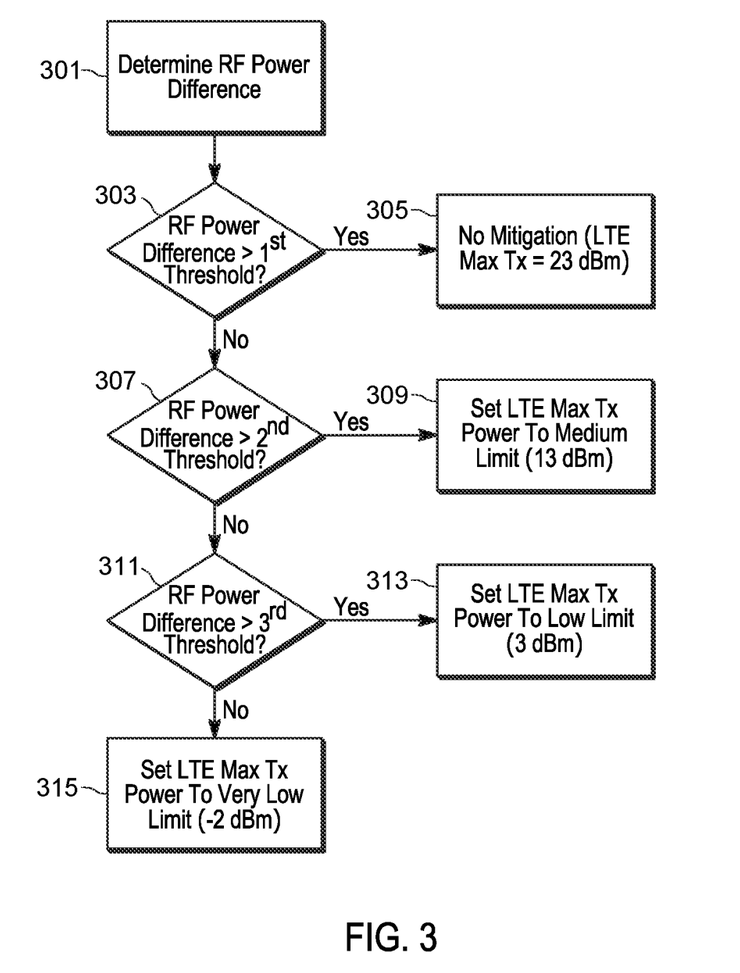
FIG. 3 is a flowchart of a method for identifying and applying an appropriate mitigation using multi-tiered power level control using the system of FIG. 1.

FIG. 3 illustrates an example in which interference between the primary transceiver 101 and the secondary transceiver 103 is mitigated by limiting the maximum transmit power of the secondary transceiver 103 and in which the magnitude of the maximum allowed transmit power of the secondary transceiver 103 is determined based on the quantified magnitude of electromagnetic isolation. In this example, antenna isolation is measured (e.g., quantified) when the secondary transceiver 103 is transmitting and the measured isolation is mapped to one of four different predefined ranges. As the isolation changes from one range to another, the control system 113 adjusts the mitigation level to allow the secondary transceiver 103 to utilize the highest maximum transmit power that does not impair the operation of the primary transceiver 101. When isolation between the primary transceiver 101 and the secondary transceiver 103 is high (i.e., a very low electromagnetic coupling), no mitigation is applied to limit the maximum transmit power of the secondary transceiver 103. However, as isolation decreases and coupling increases, the magnitude of the attenuation applied by the control system 113 is increased causing the maximum transmit power of the secondary transceiver to be reduced.

More specifically, in the example of FIG. 3, the control system 113 determines a difference between an RF power detected by the secondary radio-frequency energy detector 117 and an RF power detected by the primary radio-frequency energy detector 123 (step 301). If the radio-frequency power difference is greater than a first thresholds (e.g., 30 dB) (indicating a relatively high degree of isolation and a relatively low degree of coupling) (step 303), no mitigation is applied (step 305) and the secondary transceiver 103 is allowed to operate based on its normal maximum transmit power (e.g., 23 dBm). If the radio-frequency power difference is less than the first threshold and greater than a second threshold (e.g., 20 dB) (step 307), the control system 113 sets the maximum transmit power of the secondary transceiver 103 to a "medium" limit by applying a 10 dB attenuation to the radio-frequency signals transmitted by the secondary transceiver 103 thereby reducing the maximum transmit power of the secondary transceiver 103 to 13 dBm (step 309). If the radio-frequency power difference is less than the second threshold and greater than a third threshold (e.g., 10 dB) (step 311), the control system 113 sets the maximum transmit power of the secondary transceiver 103 to a "low" limit by applying a 20 dB attenuation to the radio-frequency signals transmitted by the secondary transceiver 103 thereby reducing the maximum transmit power of the secondary transceiver 103 to 3 dBm (step 313). Finally, if the radio-frequency power difference is less than the third threshold (step 311), the control system 113 sets the maximum transmit power of the secondary transceiver 103 to a "very low" limit by applying a 30 dB attenuation to the radio-frequency signals transmitted by the secondary transceiver 103 thereby reducing the maximum transmit power of the secondary transceiver 103 to −3 dBm (step 315).

FIG. 3 is just one example of possible mitigation techniques and a method of selecting an appropriate mitigation technique based on the quantified electromagnetic isolation between the primary transceiver 101 and the secondary transceiver 103. Other implementations are possible. For example, in other implementations, the number of thresholds, the values of the thresholds, and the mitigation levels may be configurable parameters that can be optimized for a particular system and/or adjustable by a user of the system. Additionally, in some implementations that include an isolator (e.g., isolator 109 in the example of FIG. 1), the nominal isolation between the primary transceiver 101 and the secondary transceiver 103 is expected to be less than 30 dB. Also, in some implementations, control system 113 is configured to apply the power-level-limiting mitigation techniques by only limiting the maximum power level allowed for the secondary transceiver 103—not by adjusting or limiting the actual power level of the radio-frequency signals transmitted by the secondary transceiver 103. Accordingly, in low power/low isolation conditions, power reduction might not actually reduce the power of the radio-frequency signals transmitted by the secondary transceiver because the transmit power is already below the maximum power limit corresponding to the applicable mitigation.

In some implementations, such as illustrated in the example of FIG. 3, the mitigation applied depends only on the determined magnitude of the quantified isolation. Accordingly, the mitigation might be removed as soon as the radio-frequency power difference falls below the first threshold. However, in other implementations, the control system 113 may be configured to consider additional information in determining which mitigation to apply. For example, in some implementations, the control system 113 is further configured to determine an appropriate mitigation based in part on which mitigation is currently being applied and how long the current mitigation has been applied. Additionally, in some implementations, the control system 113 may be configured to apply an offset to the thresholds defining the ranges for different mitigation techniques when transitioning from one defined range to an adjacent range to account for system hysteresis.

Figure 4:
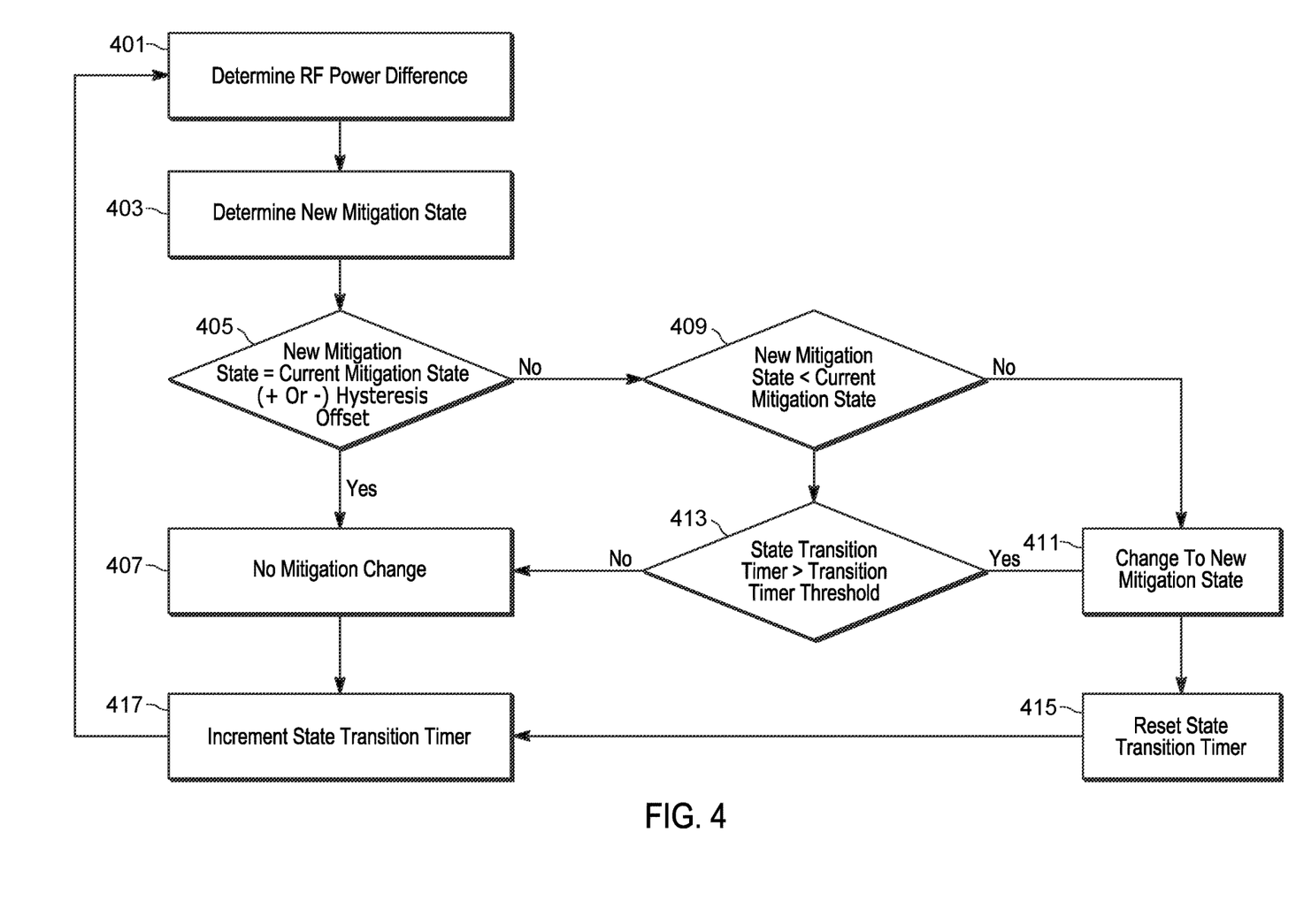
FIG. 4 is a flowchart of a method for state-based application and transitions between different interference mitigation techniques using the system of FIG. 1.

FIG. 4 illustrates an example of a method implemented by the control system 113 in the example of FIG. 1 that manages transitions between different mitigation techniques based on the current mitigation being applied (i.e., a current mitigation state) and the amount of time that the current mitigation has been applied while also utilizing hysteresis offsets when transitioning between adjacent mitigation states. As in the examples described above, the control system 113 quantifies the electromagnetic isolation between the primary transceiver 101 and the secondary transceiver 103 based on a determined radio-frequency power difference between the output of the primary radio-frequency energy detector 123 and the secondary radio-frequency energy detector 117 (step 401).

Based on the quantified difference, the control system 113 determines an appropriate new mitigation state (step 403). However, a hysteresis offset is added to the high end and/or low end of the range of values corresponding to the current mitigation state and, if the quantified difference falls within the range of values for the current mitigation state extended by the hysteresis offset(s) (step 405), then no mitigation change is applied (step 407). For example, using the same thresholds and ranges defined by the example of FIG. 3 and a hysteresis offset of 1 dB, if the system is current applying the "Medium Limit" mitigation (i.e., FIG. 3, step 309) and the new quantified difference is 30.5 dB, the control system 113 in the method of FIG. 4 would continue to apply the "Medium Limit" mitigation instead of removing the mitigation because the new quantified difference falls within the range for the current mitigation state when extended by the hysteresis offset.

Returning to the example of FIG. 4, after determining that the quantified difference corresponds to a different mitigation state (even with the applied hysteresis offset(s) applied to the range of values corresponding to the current mitigation state), the control system 113 determines whether the new mitigation state corresponds to a higher degree of mitigation than the current mitigation state (step 409). In other words, is the quantified difference improving (i.e., less interference/coupling and more isolation) or worsening (i.e., more interference/coupling and less isolation)? In response to determining that the new mitigation state corresponds to a higher degree of mitigation than the current mitigation state, the control system 113 is configured to transition to the new mitigation state (step 411) regardless of the amount of time that the system has been operating in its current mitigation state. However, if the new mitigation state corresponds to a lower degree of mitigation than the current mitigation state, the control system 113 transitions to the new mitigation state (step 411) only if the system has been operating in the current mitigation state for longer than a defined threshold period of time (step 413). Otherwise, the control system 113 continues to operate the system in the current mitigation state (step 407) until the time threshold is exceeded.

In the example of FIG. 4, the control system 113 is configured to use a state transition timer to monitor the amount of time that the system has been operating in its current mitigation state. The control system 113 is configured to reset the state transition timer to zero (step 415) each time the control system 113 transitions to a different mitigation state (step 411) and the state transition timer is incremented (step 417) periodically while the control system 113 continues to operate the system in the same mitigation state (step 407). In some implementations, such as illustrated in the example of FIG. 4, the control system 113 is configured to increment the state transition timer with each iteration in which the control system 113 evaluates the quantified radio-frequency power difference in order to determine which mitigation state is appropriate. In other implementations, the control system 113 is configured to increment the state transition timer based on another timer mechanism such as, for example, a system clock.

Figure 5:
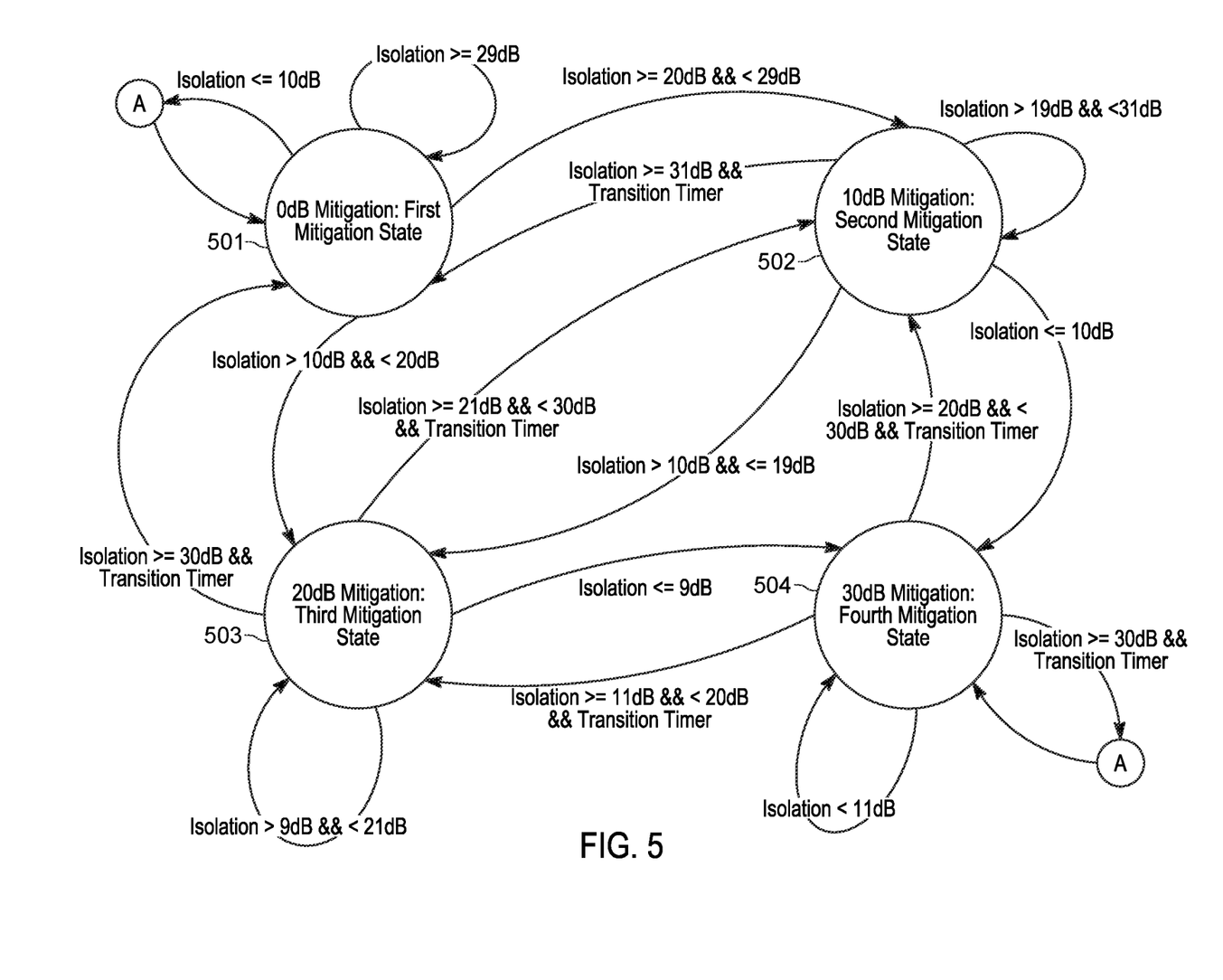
FIG. 5 is a state-transition diagram for the state-based interference mitigation method of FIG. 4.

FIG. 5 illustrates the method of FIG. 4 as a state transition diagram. The example of FIG. 5 illustrates four different mitigation states: a first mitigation state 501 (in which no attenuation is applied to the maximum transmission power of the secondary transceiver 103), a second mitigation state 502 (in which a 10 dB attenuation is applied to the maximum transmission power of the secondary transceiver 103), a third mitigation state 503 (in which a 20 dB attenuation is applied to the maximum transmission power of the secondary transceiver 103), and a fourth mitigation state 504 (in which a 30 dB attenuation is applied to the maximum transmission power of the secondary transceiver 103).

When operating in the first mitigation state 501 (i.e., no mitigation applied), the control system 113 remains in the first mitigation state 501 as long as the quantified isolation remains greater than or equal to 29 dB. When the quantified isolation is greater than or equal to 20 dB and less than 29 dB, the control system 113 transitions from the first mitigation state 501 to the second mitigation state 502. When the quantified isolation is greater than 10 dB and less than 20 dB, the control system 113 transitions from the first mitigation state 501 to the third mitigation state 503. And, when the quantified isolation is less than or equal to 10 dB, the control system 113 transitions from the first mitigation state 501 to the fourth mitigation state 504.

When operating in the second mitigation state 502 (i.e., 10 dB attenuation to the maximum transmission power of the secondary transceiver 103), the control system 113 remains in the second mitigation state 502 as long as the quantified isolation remains greater than 19 dB and less than 31 dB. When the quantified isolation is greater than 10 dB and less than or equal to 19 dB, the control system 113 transitions from the second mitigation state 502 to the third mitigation state 503. When the quantified isolation is less than or equal to 10 dB, the control system 113 transitions from the second mitigation state 502 to the fourth mitigation state 504. When the quantified isolation is greater than or equal to 31 dB (indicating an improvement in the quantified isolation metric), the control system 113 transitions from the second mitigation state 502 to the first mitigation state 501, but only if the state transition timer exceeds the timer threshold (if the timer threshold is not yet exceed, then the control system 113 continues to operate the system in the second mitigation state 502).

When operating in the third mitigation state 503 (i.e., 20 dB attenuation to the maximum transmission power of the secondary transceiver 103), the control system 113 remains in the third mitigation state 503 as long as the quantified isolation remains greater than 9 dB and less than 21 dB. When the quantified isolation is less than or equal to 9 dB, the control system 113 transitions from the third mitigation state 503 to the fourth mitigation state 504. When the quantified isolation is greater than or equal to 21 dB and less than 30 dB, the control system 113 transitions from the third mitigation state 503 to the second mitigation state 502, but only if the state transition time exceeds the time threshold. Similarly, when the quantified isolation is greater than or equal to 30 dB, the control system 113 transitions from the third mitigation state 503 to the first mitigation state 501, but only if the state transition time exceeds the time threshold. If the quantified isolation is greater than or equal to 21 dB and the state transition timer does not yet exceed the time threshold, then the control system 113 continues to operate in the third mitigation state 503 and does not transition to the first mitigation state 501 or the second mitigation state 502.

When operating in the fourth mitigation state 504, the control system 113 remains in the fourth mitigation state as long as the quantified isolation remains less than 11 dB. Additionally, because in the example of FIG. 5 the fourth mitigation state 504 corresponds to the highest level of mitigation and transitioning to any other mitigation state would be a transition to a lower degree of mitigation, the control system 113 remains in the fourth mitigation state as long as the state transition timer does not exceed the timer threshold regardless of the magnitude of the quantified isolation. Once the state transition timer exceeds the timer threshold, the control system 113 will transition from the fourth mitigation state to the third mitigation state 503 when the quantified isolation is greater than or equal to 11 dB and less than 20 dB, to the second mitigation state 502 when the quantified isolation is greater than or equal to 20 dB and less than 30 dB, and to the first mitigation state 501 when the quantified isolation is greater than or equal to 30 dB.

Again, FIG. 4 illustrates just one specific example of a state-based mechanism for managing transitions between mitigation states in the communication device of FIG. 1. In other implementations, the number of mitigation states, threshold values, and mitigation levels may be different and/or may be configurable parameters that can be optimized for a particular system or target performance characteristics. Additionally, in some implementations, the control system 113 may be configured to use the same timer threshold duration (e.g., 5 seconds for all applicable state transitions. In other implementations, the control system 113 may be configured to use a different timer threshold duration for all applicable state transitions or to use a combination of various different timer threshold durations depending on the current mitigation state and/or the new mitigation state. Similarly, in the example of FIG. 5, the same hysteresis offset (i.e., 1 dB) is applied to the low and high end of each range of values for each mitigation state. However, in other implementations, the control system 113 may be configured to use a different hysteresis offset value for all applicable state transitions or to use a combination of various different hysteresis offsets for the high & low ends of the ranges and/or for the different mitigation states.

Returning now to the example of FIG. 1, in various different implementations, the components of the communication system illustrated in FIG. 1 can be constructed, for example, using electronic circuits, hardware logic circuits, electronic processors (configured to execute computer-executable software instructions), or various combinations thereof. For example, as illustrated in the example of FIG. 6, the control system 113 may include an electronic processor 601 and a non-transitory computer-readable memory 603 storing data and computer-executable instructions that, when executed by the electronic processor 601 provide the functionality of the control system 113 including, for example, the functionality described in the examples herein.

Figure 6:
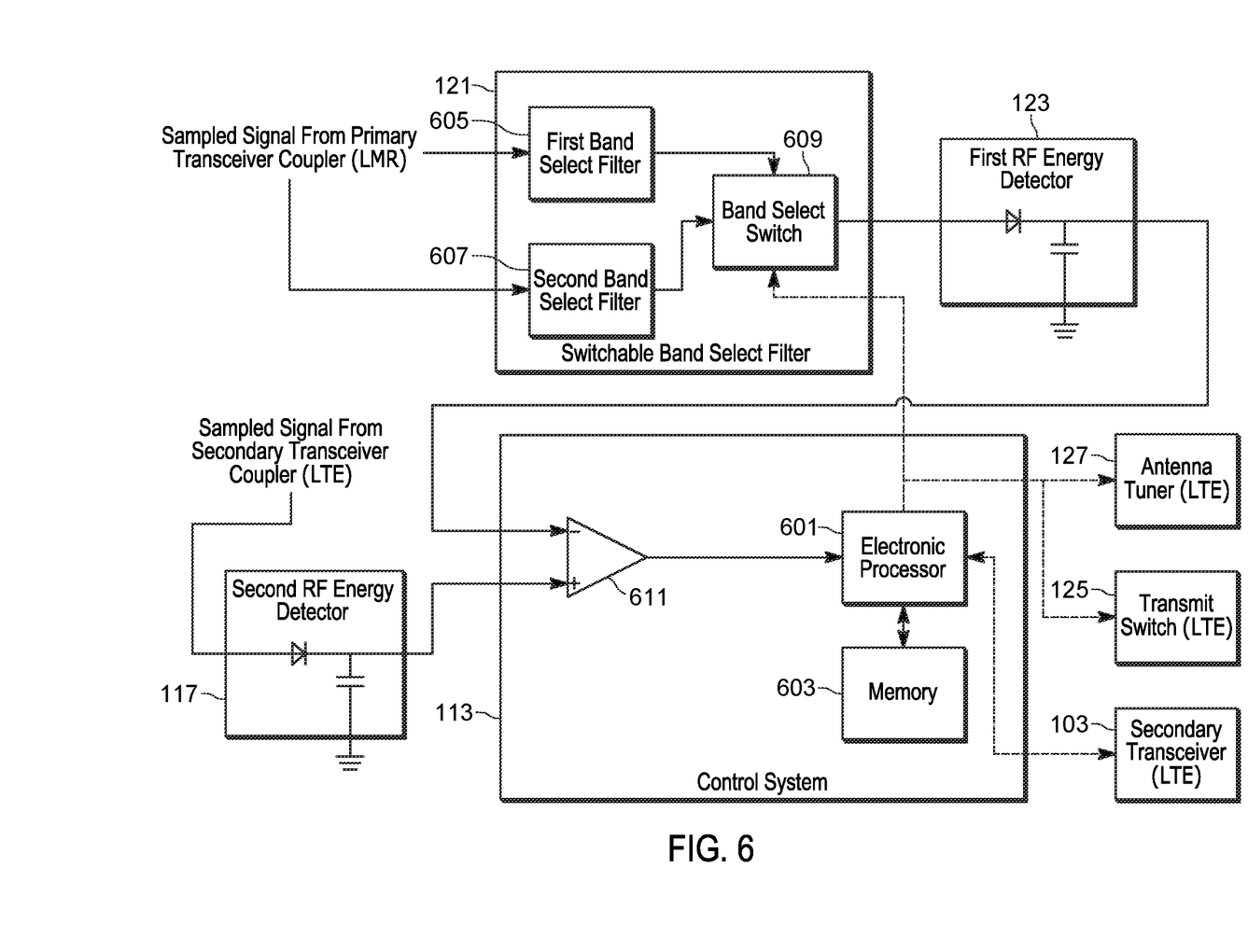
FIG. 6 is a block diagram of a further example of the interference mitigation system of the communication device of FIG. 1.

As also illustrated in the example of FIG. 6, switchable band select filter 121 may be configured to include a plurality of different band select filters (e.g., including the first band select filter 605 and the second band select filter 607). Each band select filter is configured to isolate a different and/or overlapping band of frequencies and to filter out RF signal portions of other frequencies not within the corresponding band of the band select filter. Each band select filter can be implemented, for example, as a different hardware circuit or as software operating on an electronic processor configured to filter digitized signal data received via an analog-to-digital converter. In the example of FIG. 6, the switchable band select filter 121 also includes a controllable band select switch 609 that is configured to receive a control signal input form the electronic processor 601 of the control system 113 and, based on the control signal input, couple one band select filter of the plurality of band select filters to the output of the switchable band select filter 121.

Accordingly, in some implementations, the electronic processor 601 of the control system 113 is configured to receive an input from the secondary transceiver 103 indicating that the secondary transceiver 103 is transmitting and also identifying the frequency or frequencies at which the secondary transceiver 103 is transmitting. In response to receiving this input from the secondary transceiver 103, the electronic processor 601 identifies a band select filter corresponding to the frequency or frequencies at which the secondary transceiver 103 is transmitting and transmits a control signal to the band select switch 609 that causes the band select switch 609 to couple the appropriate band select filter to the output of the switchable band select filter 121. Although the sampled signal from the primary transceiver coupler 119 is provided as input to each of the different band select filters (e.g., both the first band select filter 605 and the second band select filter 607), the filtered output signal from only one of the band select filters is coupled to the input of the primary radio-frequency energy detector 123.

In this way, the sampled radio-frequency energy from the radio-frequency received by the primary antenna 105 passes through only a band select filter that is specific to the active transmit band of the secondary transceiver 103. This limits the radio-frequency power that is quantified by the primary radio-frequency energy detector 123 to only the frequency band of concern and reduces the likelihood of sensing irrelevant ambient energy. Multiple filters can be used for multiple frequency bands and can be controlled by front end control lines sent from the electronic processor 601.

Also, in the example of FIG. 6, the primary radio-frequency energy detector 123 includes a detector circuit with a diode coupled to receive as input the output from the switchable band select filter 121 and a capacitor coupled between the output of the diode and ground. Similarly, the secondary radio-frequency energy detector 117 includes a similar detector circuit with a diode coupled to receive as input the sampled signal from the secondary transceiver coupler 115 and a capacitor coupled between the output of the diode and ground.

As illustrated in the example of FIG. 6, the output from the primary radio-frequency energy detector 123 and the secondary radio-frequency energy detector 117 are coupled to the two input terminals of a differential amplifier 611 (also referred to as a "difference amplifier") of the control system 113. The output signal from the differential amplifier 611 is indicative of a difference between the output of the primary radio-frequency energy detector 123 and the secondary radio-frequency energy detector 117 and is coupled to an input of the electronic processor 601. The electronic processor 601 is configured to convert this analog input from the differential amplifier 611 to a digital signal (e.g., using an analog-to-digital converter). In this example, the electronic processor 601 is configured to quantify a value indicative of an electromagnetic isolation between the primary transceiver 101 and the secondary transceiver 103 based on this digitized signal and selects an appropriate mitigation technique to apply based on a magnitude of the quantified isolation (e.g., as discussed in the examples above). In turn, the electronic processor 601 is configured to apply the selected mitigation, for example, by transmitting applicable control signals to various components of the communication device including, for example, the antenna tuner 127, the transmit switch 125, and/or the secondary transceiver 103 itself.

The control system 113 illustrated in the example of FIG. 6 is just one possible example of a control system 113 configured for use in the communication device of FIG. 1.

Other implementations are possible. For example, instead of using a differential amplifier 611 to generate a difference signal, in some implementations, the control system 113 may be configured to couple the output signals of the primary radio-frequency energy detector 123 and the secondary radio-frequency energy detector 117 to the electronic processor 601 (e.g., via one or more analog-to-digital converters). In such implementations, the electronic processor 601 may be configured to separately digitize the outputs received from each radio-frequency energy detector 123, 117 and to quantify the electromagnetic isolation by calculation based on the two digitized signals.

Figure 7:
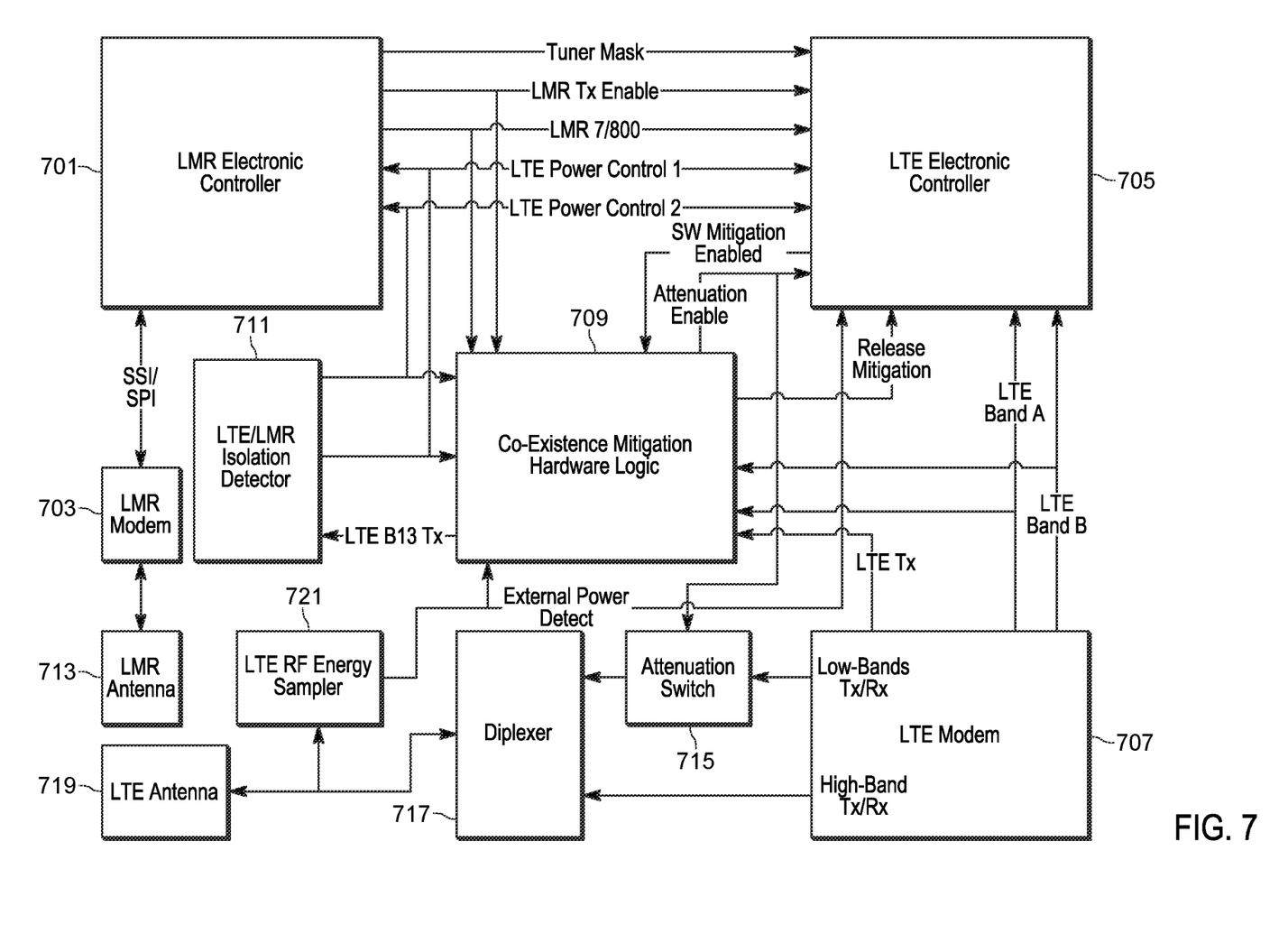
FIG. 7 is a schematic diagram of another example of a communication device including multiple transceivers and an interference mitigation system in accordance with some embodiments.

Additionally, although the example of FIG. 6 illustrates a control system 113 that includes only a single electronic processor 601 and a corresponding memory 603, in other implementations, the communication device may include multiple different electronic processors configured to collectively provide the functionality of the communication device including, for example, the interference mitigation functionality as described in the examples above. FIG. 7 illustrates one example of a communication device configured to provide interference mitigation functionality as described above using multiple different electronic controllers. In this example, each controller may include, for example, an electronic processor and a corresponding non-transitory computer-readable memory storing instructions that are executed by the electronic processor, a hardware logic circuit, a hardware detection circuit, and/or combinations thereof.

In the example of FIG. 6, a LMR electronic controller 701 is communicatively coupled to an LMR modem 703 and an LTE electronic controller 705 is communicatively coupled to an LTE modem 707. A co-existence mitigation hardware logic circuit 709 is communicatively coupled to both the LMR electronic controller 701 and the LTE electronic controller 705 as well as an LTE/LMR isolation detector circuit 711. The LMR modem 703 is configured to generate and transmit radio frequency signals through the LMR antenna 713 and is also configured to receive radio frequency signals through the LMR antenna 713.

The LTE modem 707 in the example of FIG. 7 includes two separate communication channels—one for transmitting and receiving radio-frequency signals in low-frequency bands and another for transmitting and receiving radio-frequency signals in high-frequency bands. The low-band communication channel of the LTE modem 707 is coupled to a first input of a diplexer 717 through a controllable attenuation switch 715 while the high-band communication channel of the LTE modem 707 is coupled directly to a second input of the diplexer 717. High-band and low-band radio-frequency signals are both transmitted and received by the LTE modem 707 through an LTE antenna 719. An LTE radio-frequency energy sampler circuit 721 is coupled to the sample the energy of radio-frequency signals transmitted or received by the LTE modem 707 at a location between the LTE antenna 719 and the diplexer 717. The sampled energy of the radio-frequency signals is then transmitted from the LTE radio-frequency energy sampler circuit 721 as a control signal to the co-existence mitigation hardware logic circuit 709 and the LTE electronic controller 705 indicative of a detected external power ("External Power Detect").

The LTE modem 707 is configured to transmits an output signal to the co-existence mitigation hardware logic circuit 709 indicative of whether the LTE modem 707 is currently transmitting ("LTE Tx"). Similarly, the LMR electronic controller 701 is configured to transmit an output signal to both the co-existence mitigation hardware logic circuit 709 and the LTE electronic controller 705 indicative of whether the LMR modem 703 is currently enabled to transmit radio-frequency signals.

The LTE modem 707 is also configured to transmit to both the LTE electronic controller 705 and to the co-existence mitigation hardware logic circuit 709 signals indicative of the frequency and/or frequencies (e.g., a range of frequencies) currently being transmitted by the LTE modem 707 (i.e., "LTE Band A" and "LTE Band B"). Based on this information, the co-existence mitigation hardware logic circuit 709 transmits a control signal ("LTE B13 Tx") to the LTE/LMR isolation detector circuit 711 to control the operation of a switchable band select filter function of the LTE/LMR isolation detector circuit 711 (e.g., similar to the switchable band select filter 121 described in the examples above).

In the example of FIG. 7, the LTE/LMR isolation detector circuit 711 is configured to detect and quantify isolation between the LTE modem 707 and the LMR modem 703 using techniques such as, for example, those described in the examples above. Based on the quantified isolation, the LTE/LMR isolation detector circuit 711 is configured to transmit a pair of LTE power control signals indicative of adjustments to be made to the transmit power of the LTE modem 707 as part of the selected mitigation technique. The LTE/LMR isolation detector circuit 711 is communicatively coupled to transmit these LTE power control signals to respective general purpose input/output (GPIO) pins of the LMR electronic controller 701, the LTE electronic controller 705, and the co-existence mitigation hardware logic circuit 709.

The co-existence mitigation hardware logic circuit 709 is configured to output an attenuation enable signal under certain conditions (e.g., based on the LTE power control signals and other inputs received from the other controllers). The attenuation enable signal is transmitted to the attenuation switch 715 to activate (e.g., open) the attenuation switch 715 to apply an attenuation to radio-frequencies signals transmitted by the LTE modem 707 on the low-band channel. The attenuation enable signal is also provided as an input to the LTE electronic controller 705 to inform the LTE electronic controller 705 when the attenuation is being actively applied.

The LTE electronic controller 705 is also configured to apply, through execution of software instructions, some or all of the interference mitigation functionality (e.g., as described in the examples above). For example, in some implementations, the LTE electronic controller 705 may be configured to define a maximum transmit power for the LTE modem 707 through software and to control the operation of the LTE modem 707 to operate below the defined maximum transmit power for the selected mitigation scheme. The LTE electronic controller 705 is communicatively coupled to the co-existence mitigation hardware logic circuit 709 to transmit an output signal to the co-existence mitigation hardware logic circuit 709 indicating when software-based mitigation is being actively applied and, in some cases, identifying to the co-existence mitigation hardware logic circuit 709 the specific mitigation that is being applied by the software. The co-existence mitigation hardware logic circuit 709 is also configured to transmit an interrupt signal to the LTE electronic controller 705 indicating that the mitigation applied by software executed on the LTE electronic controller 705 is to be released/stopped ("Release Mitigation").

In some implementations of the system of FIG. 7, the LMR electronic controller 701 is configured to transmit control signals to the co-existence mitigation hardware logic circuit 709 and to the LTE electronic controller 705 indicating when the LMR modem 703 is receiving radio-frequency signals on a configuration range of LMR frequencies. The LTE modem 707 is configured to transmit control signals to the co-existence mitigation hardware logic circuit 709 and to the LTE electronic indicating when the LTE modem 707 is operating (i.e., transmitting radio-frequency signals) on configurable LTE bands. The LTE/LMR isolation detector circuit 711 is configured to output signals reporting multiple levels of detected isolation to the co-existence mitigation hardware logic circuit 709 and to the LTE electronic controller 705. The co-existence mitigation hardware logic circuit 709 is configured to engage the attenuation switch 715 in response to simultaneously detecting both (a) signals indicating poor levels of antenna isolation and (b) that conflicting LMR receiving bands and LTE transmission bands are concurrently in use. By engaging the attenuation switch 715, the co-existence mitigation hardware logic circuit 709 temporarily stops LTE transmissions that might corrupt the radio frequency signals received by the LMR modem 703. Similarly, the LTE electronic controller 705 is configured to engage LTE power reduction mechanisms and/or data speed throttling at the LTE modem in response to simultaneously detecting both (a) signals indicating poor levels of antenna isolation and (b) that conflicting LMR receiving bands and LTE transmission bands are concurrently in use. The LTE electronic controller 705 then generates a signal to the co-existence mitigation hardware logic circuit 709 indicating that the applicable software-based mitigation mechanisms have been applied to the LTE modem 707. In response to receiving this "SW mitigation engaged" signal from the LTE electronic controller 705, the co-existence mitigation hardware logic circuit 709 alters the control signal transmitted from the co-existence mitigation hardware logic circuit 709 to the attenuation switch 715 causing the attenuation switch 715 to be released. The co-existence mitigation hardware logic circuit 709 is further configured to generate a "Release Mitigation" signal to the LTE electronic controller 705 in response to detecting signals received from the LTE/LMR isolation detector circuit 711 indicating adequate levels of antenna isolation. In response to receiving the "Release Mitigation" signal from the co-existence mitigation hardware logic circuit 709, the LTE electronic controller 705 disengages the currently applied software-controlled mitigation mechanism (e.g., LTE power reduction and/or data speed throttling mechanism applied to the LTE modem 707). In this way, the system of FIG. 7 is able to provide a quick response mitigation (e.g., engaging the attenuation switch 715) to prevent LTE transmissions from degrading LMR receiving operations and then (e.g., after disengaging the attenuation switch 715) subsequently allows degraded LTE operations to support coexistence with the LMR receiving operations.

Additionally, in some implementations of the example of FIG. 7, the LTE/LMR isolation detector circuit 711 is configured to output to the co-existence mitigation hardware logic circuit 709 and to the LTE electronic controller 705 an indication of the applicable mitigation state corresponding to current isolation measurements and holds the reported state between radio-frequency signal transmissions sent by the LTE modem 707. The LTE/LMR isolation detector circuit 711 is also configured to implement the state transition timer to delay reporting of state transitions from low level isolation/mitigation states to high level isolation/mitigation states to the co-existence mitigation hardware logic circuit 709 and to the LTE electronic controller 705. Finally, in some implementations, the co-existence mitigation hardware logic circuit 709 may be configured to engage a wakeable interrupt to the LTE electronic controller 705 indicating to the LTE electronic controller 705 that new data indicative of the level/state of antenna isolation are being communicated to the LTE electronic controller 705 by the LTE/LMR isolation detector circuit 711 (because, in some implementations, the "LTE Power Controller" signals transmitted from the LTE/LMR isolation detector circuit 711 are not configured to function as a wakeable interrupt to the LTE electronic controller 705).

Accordingly, the systems and methods described in the examples above provide, among other things, methods and apparatuses to use antennas within the same communication device to assess the isolation between the primary and secondary transceivers within the device. Methods and systems are also provided for using a measurement of real-time transceiver isolation to apply and alter coexistence mitigations applied by the device to the primary and/or secondary transceiver. Since transceiver isolation can, in some cases, be correlated with radio use condition, in some implementations, the methods and systems described herein can also be used for adaptive antenna tuning that takes into account a current use condition (e.g., free space, handheld, body worn, etc.).

In some implementations, the systems and methods described herein provide an apparatus controlling simultaneous operation of two RF transceivers within a portable communication device with two respective, proximally located and electromagnetically coupled antennas comprising: a first power detection circuit that continuously detects power transmitted by the first RF transceiver; a second power detector circuit that continuously detects power coupled to a second RF transceiver from a transmitting first RF transceiver as result of electromagnetic coupling between said two RF transceivers; an isolation detection circuit that detects the isolation level between the two RF transceivers by measuring the ratio between powers detected by a first and a second power detection circuits; a simultaneous operation control circuit that generates control signal depending on the isolation level detected by an isolation detection circuit; a real-time coexistence unit (CEM) that changes maximum transmit power of a first RF transceiver depending on the control signal from a simultaneous operation control circuit to maintain the power coupled to a second RF transceiver below predefined threshold level thereby preventing instantaneous degradation of a second RF transceiver operations.

In some implementations, the simultaneous operation control circuit maps the detected isolation level to one of several predefined ranges and generates control signals corresponding to said predefined ranges. In some implementations, the CEM sets the maximum possible transmit power of a first RF transmitter according to the detected isolation range while maintaining power coupled to a second RF transceiver below predefined threshold level. In some implementations, the isolation detection circuit detects the isolation range only when a first RF transmitter is transmitting. In some implementations, the isolation detection circuit holds the generated control signal corresponding to detected isolation range between the consecutive transmit events of a first RF transmitter. In some implementations, the simultaneous operation control circuit introduces a configurable time delay between the detection of the isolation range which is higher than previously detected isolation range and the generation of the control signal corresponding to said higher isolation range. In some implementations, the first RF transceiver is an LMR transceiver and the second RF transceiver is an LTE transceiver.

In some implementations, the CEM is configured to adjust the maximum transmit power of a first RF transmitter by one or combination of: (a) maximum power setting of a first RF transmitter power amplifier; (b) tuning impedance of the first RF transceiver antenna; and (c) engaging a shunt RF switch at the first RF transceiver antenna to introduce significant attenuation. In some implementations, the CEM is configured to attenuate the maximum transmit power of a first RF transmitter by first engaging the shunt RF switch in response to the isolation detection control signal, and then lowering the maximum power setting of the first RF transmitter before disengaging the shunt RF switch.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An interference mitigation system for a portable communication device, the interference mitigation system comprising:
  an electronic control circuit configured to
    quantify a value indicative of electromagnetic isolation between a first transceiver of the portable communication device and a second transceiver of the portable communication device based on a detected radio frequency power coupled to the first transceiver from radio frequency signals transmitted by the second transceiver,
    select a mitigation action from a plurality of mitigation actions based on a magnitude of the quantified value indicative of the electromagnetic isolation, and
    apply the selected mitigation action to adjust a radio frequency characteristic of the second transceiver.

2. The interference mitigation system of claim 1, wherein the first transceiver is a land mobile radio (LMR) transceiver and the second transceiver is a long-term evolution (LTE) transceiver.

3. The interference mitigation system of claim 1, wherein each mitigation action of the plurality of mitigation actions includes at least one selected from a group consisting of adjusting a maximum power setting of the second transceiver, tuning an impedance of the second transceiver, and engaging a shunt radio frequency switch at an antenna of the second transceiver to introduce significant radio frequency power attenuation.

4. The interference mitigation system of claim 1, wherein each mitigation action of the plurality of mitigation actions corresponds to a different range of magnitudes of a plurality of ranges of magnitudes of the value indicative of the electromagnetic isolation, and
  wherein the electronic control circuit is configured to select the mitigation action from the plurality of mitigation actions by
    identifying a range of magnitudes of the plurality of ranges of magnitudes including the magnitude of the quantified value indicative of the electromagnetic isolation between the first transceiver and the second transceiver, and
    selecting the mitigation action corresponding to the identified range of magnitudes.

5. The interference mitigation system of claim 1, wherein each mitigation action of the plurality of mitigation actions corresponds to a different range of magnitudes of a plurality of non-overlapping ranges of magnitudes of the value indicative of the electromagnetic isolation, and
  wherein the electronic control circuit is configured to select the mitigation action from the plurality of mitigation actions by
    determining a current mitigation action applied to the second transceiver,
    determining a time duration that the current mitigation action has been applied to the second transceiver,
    selecting a mitigation action corresponding with a higher range of magnitudes than the current mitigation action in response to determining that the time duration exceeds a transition timer threshold and that the higher range of magnitudes includes the magnitude of the quantified value indicative of the electromagnetic isolation, and
    selecting the current mitigation action in response to determining that the time duration does not exceed the transition timer threshold and that the higher range of magnitudes includes the magnitude of the quantified value indicative of the electromagnetic isolation.

6. The interference mitigation system of claim 1, wherein each mitigation action of the plurality of mitigation actions corresponds to a different range of magnitudes of a plurality of non-overlapping ranges of magnitudes of the value indicative of the electromagnetic isolation, and
  wherein the electronic control circuit is configured to select the mitigation action from the plurality of mitigation actions by
    determining a current mitigation action applied to the second transceiver, and
    selecting the current mitigation action in response to determining that the magnitude of the quantified electromagnetic isolation is within an extended range of magnitudes corresponding to the current mitigation action, wherein the extended range of magnitudes corresponding to the current mitigation action includes the range of magnitudes corresponding to the current mitigation action extended by a first hysteresis offset at a low end of the range and extended by a second hysteresis offset at a high end of the range.

7. The interference mitigation system of claim 1, wherein the plurality of mitigation actions includes a plurality of different maximum transmit power levels for the second transceiver, wherein each maximum transmit power level of the plurality of different maximum transmit power levels corresponds to a different range of magnitudes of a plurality of ranges of magnitudes of the value indicative of the electromagnetic isolation,
  wherein the electronic control circuit is configured to select the mitigation action from the plurality of mitigation actions by
    identifying a range of magnitudes of the plurality of ranges of magnitudes including the magnitude of the quantified value indicative of the electromagnetic isolation between the first transceiver and the second transceiver, and
    selecting a maximum power transmit level for the second transceiver corresponding to the identified range of magnitudes, and
  wherein the electronic control circuit is configured to apply the selected mitigation action to the second transceiver by limiting a radio frequency transmit power of the second transceiver to below the selected maximum power transmit level.

8. The interference mitigation system of claim 1, further comprising:
  a first power detector circuit coupled to an antenna of the first transceiver and configured to detect radio frequency power coupled to the first transceiver from radio frequency signals transmitted by the second transceiver;
  a second power detector circuit coupled to the second transceiver and configured to detect radio frequency power transmitted by the second transceiver; and
  a difference amplifier configured to receive as inputs an output from the first power detector circuit and an output of the second power detector circuit,
  wherein the electronic control circuit is configured to quantify the value indicative of the electromagnetic isolation between the first transceiver and the second transceiver by determining the value indicative of the electromagnetic isolation between the first transceiver and the second transceiver based on an output of the difference amplifier.

9. The interference mitigation system of claim 8, wherein the electronic control circuit is further configured to
  determine an operating frequency of the second transceiver,
  apply a band select filter to radio frequencies signals received by the antenna of the first transceiver, wherein the applied band select filter corresponds to the determined operating frequency of the second transceiver, and
  provide the band select filtered signal from the antenna of the first transceiver as input to the first power detector circuit.

10. The interference mitigation system of claim 1, further comprising a shunt switch between the second transceiver and an antenna of the second transceiver, wherein the shunt switch is configured to attenuate a maximum radio frequency power of the second transceiver, wherein the electronic control circuit is further configured to:
  engage the shunt switch before applying the selected mitigation action, wherein engaging the shunt switch attenuates the maximum radio frequency power of the second transceiver, and disengage the shunt switch after the selected mitigation action is applied to the second transceiver,
wherein the electronic control circuit is configured to apply the selected mitigation action by adjusting control signals to the second transceiver to apply the selected mitigation to the second transceiver while the shunt switch is engaged.

11. A method of mitigating interference in a portable communication device including a plurality of transceivers each configured to transmit and receive radio frequency signals according to different communication protocols, the method comprising:
quantifying a value indicative of electromagnetic isolation between a first transceiver of the portable communication device and a second transceiver of the portable communication device based on a detected radio frequency power coupled to the first transceiver transmitted by the second transceiver of the portable communication device;
selecting a mitigation action from a plurality of mitigation actions based on a magnitude of the quantified value indicative of the electromagnetic isolation; and
applying the selected mitigation action to adjust a radio frequency characteristic of the second transceiver.

12. The method of claim 11, wherein quantifying the value indicative of the electromagnetic isolation between the first transceiver and the second transceiver includes quantifying the value indicative of the electromagnetic isolation between a land mobile radio (LMR) transceiver and a long-term evolution (LTE) transceiver.

13. The method of claim 11, wherein each mitigation action of the plurality of mitigation actions includes at least one selected from a group consisting of adjusting a maximum power setting of the second transceiver, tuning an impedance of the second transceiver, and engaging a shunt radio frequency switch at an antenna of the second transceiver to introduce significant radio frequency power attenuation.

14. The method of claim 11, wherein each mitigation action of the plurality of mitigation actions corresponds to a different range of magnitudes of a plurality of ranges of magnitudes of the value indicative of the electromagnetic isolation, and
wherein selecting the mitigation action from the plurality of mitigation actions includes
identifying a range of magnitudes of the plurality of ranges of magnitudes including the magnitude of the quantified value indicative of the electromagnetic isolation between the first transceiver and the second transceiver, and
selecting the mitigation action corresponding to the identified range of magnitudes.

15. The method of claim 11, wherein each mitigation action of the plurality of mitigation actions corresponds to a different range of magnitudes of a plurality of non-overlapping ranges of magnitudes of the value indicative of the electromagnetic isolation, and
wherein selecting the mitigation action from the plurality of mitigation actions includes
determining a current mitigation action applied to the second transceiver,
determining a time duration that the current mitigation action has been applied to the second transceiver,
selecting a mitigation action corresponding with a higher range of magnitudes than the current mitigation action in response to determining that the time duration exceeds a transition timer threshold and that the higher range of magnitudes includes the magnitude of the quantified value indicative of the electromagnetic isolation, and
selecting the current mitigation action in response to determining that the time duration does not exceed the transition timer threshold and that the higher range of magnitudes includes the magnitude of the quantified value indicative of the electromagnetic isolation.

16. The method of claim 11, wherein each mitigation action of the plurality of mitigation actions corresponds to a different range of magnitudes of a plurality of non-overlapping ranges of magnitudes of the value indicative of the electromagnetic isolation, and
wherein selecting the mitigation action from the plurality of mitigation actions includes
determining a current mitigation action applied to the second transceiver, and
selecting the current mitigation action in response to determining that the magnitude of the quantified electromagnetic isolation is within an extended range of magnitudes corresponding to the current mitigation action, wherein the extended range of magnitudes corresponding to the current mitigation action includes the range of magnitudes corresponding to the current mitigation action extended by a first hysteresis offset at a low end of the range and extended by a second hysteresis offset at a high end of the range.

17. The method of claim 11, wherein the plurality of mitigation actions includes a plurality of different maximum transmit power levels for the second transceiver, wherein each maximum transmit power level of the plurality of different maximum transmit power levels corresponds to a different range of magnitudes of a plurality of ranges of magnitudes of the value indicative of the electromagnetic isolation,
wherein selecting the mitigation action from the plurality of mitigation actions includes
identifying a range of magnitudes of the plurality of ranges of magnitudes including the magnitude of the quantified value indicative of the electromagnetic isolation between the first transceiver and the second transceiver, and
selecting a maximum power transmit level for the second transceiver corresponding to the identified range of magnitudes, and
wherein applying the selected mitigation action to the second transceiver includes limiting a radio frequency transmit power of the second transceiver to below the selected maximum power transmit level.

18. The method of claim 11, wherein quantifying the value indicative of the electromagnetic isolation between the first transceiver and the second transceiver includes determining the value indicative of the electromagnetic isolation between the first transceiver and the second transceiver based on an output of a difference amplifier,
wherein the difference amplifier receives as inputs an output from a first power detector circuit and an output from a second power detector circuit,
wherein the first power detector circuit is coupled to an antenna of the first transceiver and configured to detect radio frequency power coupled to the first transceiver from radio frequency signals transmitted by the second transceiver, and wherein the second power detector circuit is coupled to the second transceiver and configured to detect radio frequency power transmitted by the second transceiver.

19. The method of claim 18, further comprising:

determining an operating frequency of the second transceiver, applying a band select filter to radio frequencies signals received by the antenna of the first transceiver, wherein the applied band select filter corresponds to the determined operating frequency of the second transceiver; and providing the band select filtered signal from the antenna of the first transceiver as input to the first power detector circuit.

20. The method of claim 11, further comprising:

engaging a shunt switch before applying the selected mitigation action, wherein the shunt switch is coupled between the second transceiver and an antenna of the second transceiver to attenuate a maximum radio frequency power of the second transceiver; and disengaging the shunt switch after the selected mitigation action is applied to the second transceiver, wherein applying the selected mitigation action includes adjusting control signals to the second transceiver to apply the selected mitigation action to the second transceiver while the shunt switch is engaged.

* * * * *